United States Patent Office.

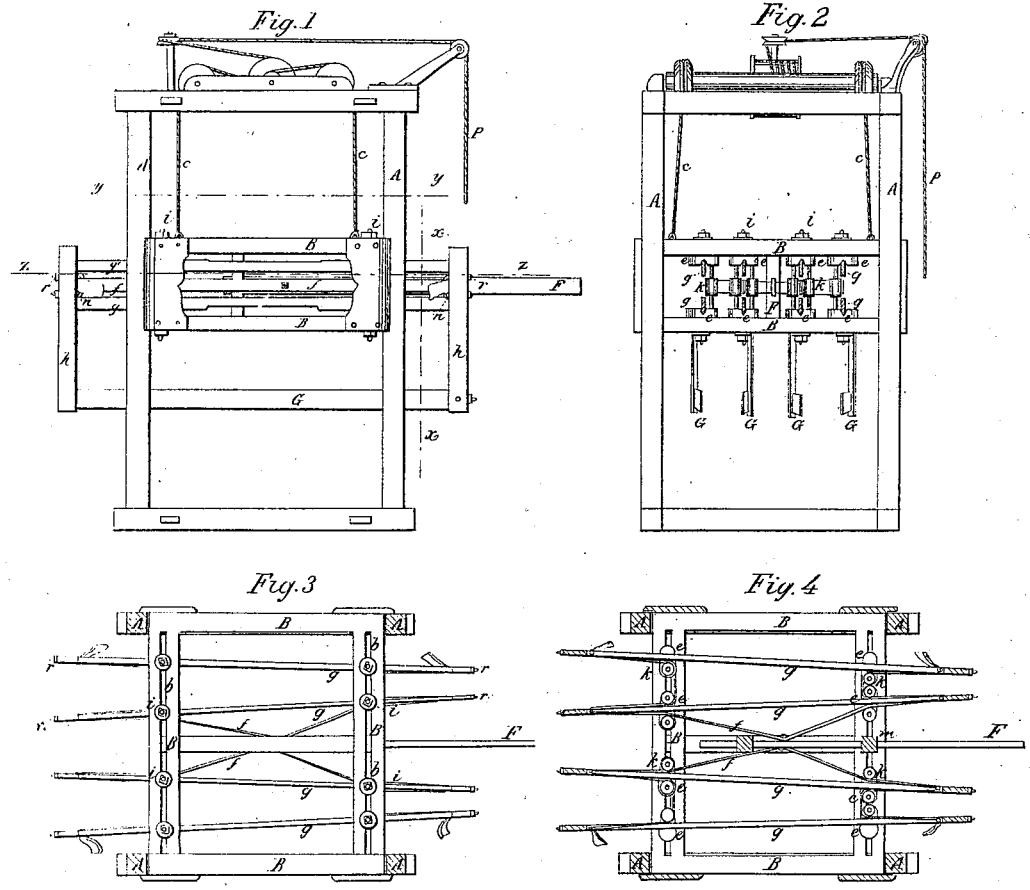

DUNCAN McDOUGALD CAMPBELL AND JOHN STEVENS, OF OSWEGO, NEW YORK.

Letters Patent No. 85,280, dated December 29, 1868.

IMPROVED MARBLE-SAWING MACHINE.

The Schedule referred to in these Letters Patent and making part of the same.

*To all whom it may concern:*

Be it known that we, DUNCAN MCDOUGALD CAMPBELL and JOHN STEVENS, of Oswego, in the county of Oswego, and State of New York, have invented a new and useful Improvement in Marble-Sawing Machines; and we do hereby declare that the following is a full, clear, and exact description thereof, which will enable those skilled in the art to make and use the same, reference being had to the accompanying drawings, forming part of this specification, in which—

Figure 1 is a side view of our invention;

Figure 2 is a sectional end view, taken in the line $x\ x$ in fig. 1;

Figure 3 is a horizontal section, taken in the line $y\ y$ in fig. 1; and

Figure 4 is a horizontal section, taken in the line $z\ z$ in fig. 1.

Similar letters of reference indicate like parts in all the figures.

This invention relates to certain improvements in marble or stone-sawing machines, whereby the saws are adjusted to operate at various angles, and at different distances from each other, with the greatest facility, as hereinafter more fully explained.

In the accompanying drawings—

A A is a frame-work, in which is suspended a saw-holding frame, B B, by means of cords $c\ c$.

The saw-holding frame B is suspended in such manner as to slide vertically in the main frame A, for the purpose of feeding the saws down to their work, and is provided with adjustable guides $e\ e$ and driving-bands $f\ f$.

Each saw, G, figs. 1 and 2, is held in a sash; $h\ h, g\ g$, fig. 1, the two horizontal bars, $g\ g$, of which run in grooves in the guides $e\ e$, as shown in fig. 2.

These guides or guide-blocks $e$ are adjustable laterally in slots $b\ b$ in the frame B, fig. 3, and are secured by means of screw-bolts $i\ i$ passing through said slots $b$.

Each pair of guide-blocks $e$ carries one or more vertical rollers $k$, figs. 2 and 4, which act as guides for the driving-straps or belts $f$.

For sawing blocks in a tapering or monumental form, the saws are set as shown by $g\ g$, fig. 4.

The saws may be of any desired number, a gang of four saws being shown in the drawings.

F is a sliding bar, to which the driving-power is applied. This bar slides through uprights $m\ m$ in the frame B, fig. 4; the belts $f$ being fastened to this sliding bar, and arranged around the rollers $k$, as shown by red lines in fig. 4, and secured to the heads of the saw-sashes.

The saws are moved longitudinally in their various positions by a like movement of the driving-bar F.

The belts $f$ are secured to the heads $h$ in an adjustable manner by means of loops $n\ n$, fig. 1, which jam the belts against said heads $h$ by means of nuts $r$ on the back sides of the heads; and when the saws are to be arranged at a new angle, or the distance between them is to be changed, then the loops $n$ are slackened, and when the belts $f$ are thus set free from the heads $h$, the guide-blocks $e$ are adjusted in the slots $b$, fig. 3, so as to bring the saws into the required position, and the belts $f$ then being drawn tight again, are secured by the clamping-loops $n$, and the machine is ready for working.

The main part of the weight of the frame B is sustained by a counterbalance-weight placed on the rope $p$, fig. 1.

By these means the saws are brought to act in any desired position with great readiness, and a very snug, efficient, and inexpensive apparatus is obtained.

Having thus described our invention,

What we claim as new, and desire to secure by Letters Patent, is—

The laterally-adjustable guides $e\ e$, rollers $k\ k$, belts $f\ f$, and clamping-loops $n\ n$, in connection with the saws G $g\ h$ and feeding-frame B, all constructed and operating as herein shown and described, and for the purpose set forth.

The above specification of our invention signed by us, this 24th day of September, 1868.

D. McD. CAMPBELL.
JOHN STEVENS.

Witnesses:
JOHN H. MOORE,
HERBERT C. WHITNEY.